United States Patent [19]

Li et al.

[11] 4,393,020

[45] Jul. 12, 1983

[54] METHOD FOR MANUFACTURING A FIBER-REINFORCED THERMOPLASTIC MOLDED ARTICLE

[75] Inventors: George S. Li, Macedonia; John F. Jones, Cuyahoga Falls; William M. Giffen, Jr., Hudson, all of Ohio

[73] Assignee: The Standard Oil Company, Cleveland, Ohio

[21] Appl. No.: 313,015

[22] Filed: Oct. 19, 1981

Related U.S. Application Data

[63] Continuation of Ser. No. 106,064, Dec. 20, 1979, abandoned.

[51] Int. Cl.³ .............................................. B29D 3/02
[52] U.S. Cl. ................................... 264/108; 427/389; 427/389.8; 427/389.9; 523/222; 524/702; 524/704; 524/789; 264/109

[58] Field of Search ................ 264/108, 109; 523/222; 524/702, 704, 789; 427/389, 389.8, 389.9

[56] References Cited

U.S. PATENT DOCUMENTS 2,688,774  9/1954  Malinowski et al. ............... 264/137
3,635,879  1/1972  Baer et al. ........................... 428/392

FOREIGN PATENT DOCUMENTS 814892  6/1969  Canada .

Primary Examiner—Maurice J. Welsh
Attorney, Agent, or Firm—William D. Mooney; Herbert D. Knudsen; Larry W. Evans

[57] ABSTRACT

Molded fiber-reinforced thermoplastic articles are prepared by a novel two-step process involving an in situ polymerization of monomers onto the fiber followed by compression molding of the product.

14 Claims, No Drawings

METHOD FOR MANUFACTURING A FIBER-REINFORCED THERMOPLASTIC MOLDED ARTICLE

This is a continuation of application Ser. No. 106,064 filed Dec. 20, 1979, abandoned.

This invention relates to a two-step process for preparing fiber-reinforced thermoplastic articles having excellent physical properties and more particularly pertains to molded fiber-reinforced thermoplastic articles having more than 50% by weight of fibers in them or having more than 60% by weight total of fibers plus fillers in them.

Fiber-reinforced thermoplastic articles have been prepared in a variety of ways in the past. U.S. Pat. No. 2,688,774 describes a method for incorporating glass fibers into polystyrene for injection molding of the product. The materials embodied in U.S. Pat. No. 2,688,774 contain more than 50% by weight of resin, and the final products are made by injection molding rather than compression molding. It is known that injection molding of any fiber-reinforced thermoplastic material results in a molded product having relatively short fibers because of the injection-molding process and equipment used therefor. In U.S. Pat. No. 3,635,879, polymer-coated glass-fiber bundles are described which are said to resist debundling and avoid haystacking when they are blended, fed and processed in injection-molding operations. Canadian Pat. No. 814,892 describes an in situ injection-molding process in which certain monomers are fed to an injection-molding machine with or without fibers and fillers and are allowed to polymerize to form a foamed, possibly fiber-reinforced, injection-molded product.

Unlike prior art processes, the present invention is carried out in two discrete steps. In the first step, a vinyl monomer component, which may be a single vinyl monomer or a mixture of more than one vinyl monomer, is polymerized in the presence of a fiber or fibers to produce a thermoplastic vinyl polymer-fiber composite. For convenience, this will sometimes be called the "in situ" step. In the second step of this invention, the vinyl polymer-fiber composite from the in situ step is shaped into a useful article by compression molding. The compression molding step is preferably done under some pressure and at an elevated temperature, although the use of so-called "cold stamping" is within the scope of the present invention. We have found that our two-step process produces finished molded articles which have physical properties far superior to those prepared by prior art methods. Simply mixing preformed thermoplastic polymers with fiber and compression molding of the mixture do not provide the same products as those produced by the two-step process of this invention. Similarly, the in situ polymerization of vinyl monomer in the presence of fiber under pressure in a mold designed to produce a finished article does not produce an article having the physical properties achieved in the process of this invention.

An advantage of the present invention is the fact that molded articles can be produced which have exceptionally high fiber-to-thermoplastic resin ratios. Although other prior at methods for producing fiber-reinforced thermoplastic moldings such as injection-molding techniques are usually limited to a maximum of about 60% by weight of fibers to 40% by weight of thermoplastic resin, our process can be used to produce novel molded articles composed of more than 60% by weight of fiber and less than 40% by weight of thermoplastic resin.

In the first step of the process of this invention, the polymerization of the monomer component in the presence of the fiber component can be carried out in any manner known to those skilled in the art. This may be done in a batch process or a continuous process preferably in the substantial absence of molecular oxygen and in the presence of free-radical initiation. The polymerization can be done at ordinary or elevated temperatures and pressures. Continuous processes for the in situ polymerization of the monomer component in the presence of the fiber component can conveniently be carried out by passing an intimate mixture of the fiber component and monomer component, including catalyst, through a polymerization zone and recovering the resulting thermoplastic resin-fiber composite outside the polymerization zone. The polymerization zone can be equipped with a monomer recovery apparatus which can be used to recover and recycle any unpolymerized monomer component from the polymerization zone.

It is usually not necessary or even desirable to include chain transfer agents for molecular weight control in the in situ polymerization (step 1) because the compression molding (step 2) does not require that much flow of the thermoplastic resin takes place. This is quite unlike the type of flow which is required in the prior art injection molding of fiber-reinforced thermoplastic resins. The present invention also permits wide discretion in the arrangement and lengths of the reinforcing fibers in the compression molded article whereas in the prior art injection-molding process, the fibers are necessarily very short (⅛" or less on the average) and are entirely randomly arranged.

In the process of the present invention, it is preferred that the fibers are oriented in one direction in step 1.

The vinyl monomer component useful in the present invention can be one or more of the following monovinyl monomers: maleic anhydride, maleic acid, maleic esters, itaconic anhydride, itaconic acid, fumaric acid and fumaric esters; vinyl aromatic compounds such as styrene, alpha-methyl styrene, the vinyl toluenes, the vinyl xylenes, indene, and the like; olefinic nitriles such as acrylonitrile and methacrylonitrile; acrylic and methacrylic acid and their esters; acrylamide and methacrylamide; vinyl halides such as vinyl chloride, vinyl bromide, vinyl fluoride, vinylidene chloride, vinylidene bromide and vinylidene fluoride; vinyl esters such as vinyl acetate, isopropenyl acetate, vinyl propionates and vinyl butyrates; alpha-olefins such as ethylene, propylene, dipropylene, isobutylene and diisobutylene; vinyl ethers such as vinyl methyl ether, vinyl ethyl ether, the vinyl propyl ethers and the vinyl butyl ethers; and conjugated diolefins which will polymerize by 1,2 or 1,4 addition such as butadiene-1,3 and isoprene.

The fiber component which can be used in this invention includes the various types of fibrous glass, wool, cotton, wood, other natural cellulosics, rayons and other modified natural fibers, nylons and other types of polyamides and polyimides, polyesters, carbon fibers, acrylics, mod acrylics, and others. Almost any fiber may be used as reinforcement provided the fiber does not melt or decompose at the temperatures used for polymerization and molding.

This invention is further illustrated in the following illustrative examples wherein the amounts of the various ingredients are expressed in parts by weight unless otherwise indicated.

EXAMPLE 1

A 25-inch long, ½-inch outside diameter pipe was placed in a horizontal position. The pipe wall thickness was 0.035 inch and the inside diameter was 0.43 inch. Three electric heating tapes were wrapped around the pipe, each heating tape being independently controlled with its own rheostat. The inlet end of the pipe was heated to 90° C. and the temperature was increased away from the inlet up to 110° C. at the end of the first zone (about ⅓ of the total length of the pipe covered by the first heating tape). At the start of the second zone, the temperature inside the pipe rose rapidly to 230° C. and peaked at 240° C. shortly past the mid-point of the pipe.

Two-thirds of the way along the pipe from the inlet end to the outlet end, the second heating zone ended and the third and final heating zone started. At this point, the temperature inside the pipe dropped from slightly under 240° C. down to 200° C. Near the outlet end, the temperature declined to 170° C. Temperatures inside the pipe were measured with a long thermocouple attached to a digital thermometer.

Fiberglass strand roving taken from a woven mat 50 inches wide was used. Thus, each strand was 50 inches long. These 50-inch long strands weighed an average of 2.03 grams each—an average weight of 0.49 gram per liter foot of fiberglass strand roving.

The fiberglass strands could be used singly, two at a time, etc., up to a bundle filling the inside diameter of the pipe (10 to 12 strands abreast was the upper practical limit for a ½-inch outside diameter pipe).

In this particular example, 4 strands abreast were used (4×0.49 gram=1.96 grams of fiberglass per linear foot of 4-strand rope). The 4-strand rope was tied onto the end of a thin copper wire extending through the entire length of the pipe-reactor assembly. Thus, slowly pulling the copper wire from the outlet end caused the fiberglass to move slowly through the entire heated-pipe assembly.

The fiberglass, before it entered the inlet to the heated-pipe assembly, was allowed to pass through a glass guide tube down into a monomer-dip solution contained in a glass beaker, where the fiberglass was thoroughly wetted by the fluid monomers. The monomer-dip solution consisted of 43.5 parts by weight of maleic anhydride (MAH) dissolved in 56.5 parts of styrene monomer (45 mole % of MAH/55 mole % of styrene). A small amount of high temperature free-radical initiator (0.3 part of cumene hydroperoxide) was also present in this monomer-dip solution to assure complete conversion of monomers to copolymer resin coating on the fiberglass inside the heated-pipe reactor. The dip solution was maintained at 50 to 55° C. and constantly stirred (magnetic stirrer) to maintain a uniform temperature and prevent formation of unwanted localized hot spots. Below 50° C., the MAH monomer tended to crystallize out of the styrene solution. On the other hand, above 55° C. there was an increasing danger of an unwanted spontaneous thermal run-away pre-copolymerization occurring in the dip beaker.

After being thoroughly wetted in the above described dip solution, the fiberglass 4-strand rope was then passed up through a second glass guide tube to the inlet end of the pipe reactor. The monomer-wetted fiberglass entered the inlet end of the pipe reactor and was heated upward towards the 90° to 110° C. range. When the temperature of the fiberglass reached the 65° to 70° C. range, thermally initiated copolymerization of the monomers adsorbed on the glass surfaces began. In the 70° to 110° C. range, copolymerization proceeded at a fast rate, yet the temperature was still low enough that styrene (boiling point=145° C.) vaporization within the tube was held to a minimum.

The coated roving passed through zone 2 and zone 3 to assure high conversion. Upon passing out through the outlet end of the pipe, the resin-coated fiberglass 4-strand rope was allowed to cool in the air. After emerging past the outlet end of the pipe reactor by 1 or 2 inches, the resin coating had cooled sufficiently to be tack free.

The rate of travel through the 25-inch long pipe was approximately 6 inches per minute, giving an average residence time of about 4 minutes inside the heated pipe for each small increment of fiberglass. Four minutes' residence time in the heated pipe always proved ample for this styrene-MAH monomer system. Obviously, the longer the pipe reactor, the faster the throughput rate can be while still maintaining a 4-minute residence time inside the heated pipe.

The final resin coating was thin and essentially uniform on all the fiberglass surfaces (i.e., fibril surfaces) as seen by micrographs made by scanning electron microscopy. The resin content was found to be 23.5% for this sample (onto 76.5% of fiberglass).

Upon being pulled through the outlet end of the pipe reactor and cooled, the resin-coated 4-strand rope of fiberglass emerged as a 50-inch long, hard, relatively stiff rod resembling a small, slightly flexible, fishing pole. This resin-coated rod of fiberglass was then cut into 5-inch long pieces and then compression molded at 275° C. in a bar mold 5 inches long by a ½-inch wide. The fiberglass was thus a uniform 5 inches in length and oriented along the axis of the 5-inch bar mold. Molding pressure in the hot press was 3000 to 4000 psi and the temperature of the compression mold was monitored with a thermocouple attached to a digital thermometer. Upon reaching 275° C. in its interior, the pressure on the bar mold was released and the bar mold quickly transferred to a nearby cooling press. Pressure was quickly applied (ca. 4000 psi) and the bar mold allowed to cool below 50° C.

At this point, the bar was removed from the compression mold. No mold sticking occurred. The molded composite bar had a very smooth surface and an attractive translucent appearance.

The molded bar was found to have the following properties:

| | |
|---|---|
| resin | 23% |
| glass | 77% |
| heat-distortion temperature (HDT) | 169° C. |
| flexural strength (F.S.) | 204 × $10^3$ psi |
| flexural modulus (F.M.) | 98.6 × $10^5$ psi |
| tensile strength (T.S.) | >47.5 × $10^3$ psi |
| notched Izod impact strength | >62 foot pounds per inch of notch |
| Rockwell hardness (M scale) | 92 |

EXAMPLE 2

A. The procedure of Example 1 was followed using a monomer ratio of 55 mole % of styrene and 45 mole % of maleic anhydride. The resulting coated strands of fiberglass were cut into ½ to 1-inch lengths and molded into a test bar.

B. A test bar was prepared which is outside the scope of this invention by putting directly into the test-bar mold fiberglass strands cut into ½ to 1-inch lengths and adding to the mold the same ratio of monomers and catalyst as described in A above. The resulting mixture was compression molded as described in Example 1 and the monomers were allowed to polymerize under pressure in the presence of the fiberglass under pressure in the mold. The final test bars from A and B were tested and the results compared as shown below.

| Test Bar | Resin | Glass | HDT | Flexural Strength (psi) | Flexural Modulus (psi) | Izod (foot pounds per inch of notch) |
| --- | --- | --- | --- | --- | --- | --- |
| A | 21% | 79% | 182° C. | $56.5 \times 10^3$ | $44.7 \times 10^5$ | 42 |
| B | 21% | 79% | 181° C. | $19.6 \times 10^3$ | $17.5 \times 10^5$ | >16 |

EXAMPLE 3

A. The procedure of Example 1 was repeated using a monomer ratio of 55 mole % of styrene and 45 mole % of maleic anhydride. The final coated fiberglass strands which were made up of 23% of resin and 77% of glass were cut into 5-inch lengths, oriented lengthwise, and placed in the test-bar mold and molded into a test bar as described in Example 1. The resulting test bar was found to have a flexural strength of $204 \times 10^3$ psi, a flexural modulus of $98.6 \times 10^5$ psi, a tensile strength of greater than $47.5 \times 10^3$ psi, a notched Izod impact strength of greater than 62 foot pounds per inch of notch, and a Rockwell M hardness of 92.

B. Procedure A of this example was repeated except that the coated fiberglass was cut into ¼ to ⅜-inch lengths and these were randomly distributed in the test-bar mold before the molding of the test bar. The resulting molded test bar was found to have a heat-distortion temperature of 160° C., a flexural strength of $10.4 \times 10^3$ psi, a flexural modulus of $17.6 \times 10^5$ psi, a tensile strength of $5.22 \times 10^3$ psi, and a notched Izod impact strength of 5.22 foot pounds per inch of notch.

C. The procedure of A of this example was repeated except that one half of the coated fiberglass was cut into 5-inch lengths and the other half was cut into ⅜ to ½-inch lengths, and the 5-inch lengths were oriented lengthwise in the test-bar mold and the ⅜ to ½-inch lengths were oriented widthwise in the test-bar mold before the molding. The molded bar was found to have a heat-distortion temperature of 157° C., a flexural strength of $123 \times 10^3$ psi, a flexural modulus of $71.5 \times 10^5$ psi, a tensile strength of $45.4 \times 10^3$ psi, a notched Izod impact strength of greater than 61 foot pounds per inch of notch, and a Rockwell M hardness of 83.

EXAMPLE 4

The procedure of Example 3A was repeated except that the final coated glass strands were found to be made up of 28% by weight of resin and 72% by weight of glass. The molded test bars were found to have a heat-distortion temperature of 154° C., a flexural strength of $247 \times 10^3$ psi, a flexural modulus of $89.3 \times 10^5$ psi, a tensile strength of greater than $63 \times 10^3$ psi, a notched Izod impact strength of greater than 60 foot pounds per inch of notch, and a Rockwell M hardness of 89.

EXAMPLE 5

The procedure of Example 1 was followed using as the liquid monomer mixture 50 mole % of styrene and 50 mole % of acrylonitrile. There was also added to this monomer solution 15% by weight based on the weight of the solution of a 70:30 copolymer of styrene:acrylonitrile to serve as a thickening agent. The coated glass fiber was made up of 29% by weight of resin and 71% by weight of glass. The final molded bar was found to have a heat-distortion temperature of 88° C., a flexural strength of $79.5 \times 10^3$ psi, a flexural modulus of $42.6 \times 10^5$ psi, a tensile strength of greater than $51 \times 10^3$ psi, and a notched Izod impact strength of greater than 47.5 foot pounds per inch of notch.

EXAMPLE 6

The procedure of Example 1 was repeated except that the monomer mixture was composed of 55 mole % of styrene and 45 mole % of dimethyl itaconate. The coated glass fiber was found to contain 21% by weight of resin and 79% by weight of glass. The molded bar was found to have a heat-distortion temperature of 74° C., a flexural strength of $56.3 \times 10^3$ psi, a flexural modulus of $61.2 \times 10^5$ psi, a tensile strength of $74.8 \times 10^3$ psi, and a Rockwell M hardness of 91.

EXAMPLE 7

The procedure of Example 1 was followed except that the monomer mixture was made up of 55 mole % of styrene and 45 mole % of acrylic acid. The coated glass fiber was found to contain 14% by weight of resin and 86% by weight of glass. The molded bar was found to have a heat-distortion temperature of 149° C., a flexural strength of $72 \times 10^3$ psi, and a notched Izod impact strength of greater than 29.

EXAMPLE 8

The procedure of Example 1 was followed except that the monomer mixture was made up of 50 mole % of styrene and 50 mole % of methyl methacrylate thickened with 5% by weight, on the basis of 100 parts of solution, of a 50/50 copolymer of styrene and methyl methacrylate. The coated fiber was found to be made up of 29% by weight of resin and 71% by weight of glass. The molded bar was found to have a heat-distortion temperature of 97° C., a flexural strength of $72.6 \times 10^3$ psi, a flexural modulus of $62.7 \times 10^5$ psi, and a notched Izod impact strength of greater than 40 foot pounds per inch of notch.

EXAMPLE 9

The procedure of Example 1 was repeated except that the monomer mixture was made up of 55 mole % of methyl methacrylate and 45 mole % of maleic anhydride. The coated fibers was found to be made up of 11% by weight of resin and 89% by weight of glass. Molded bars were found to have a flexural modulus of $104 \times 10^5$ psi.

EXAMPLE 10

The procedure of Example 1 was repeated except that the monomer mixture was made up of 10% by weight of a polyphenylene oxide (poly-2,6-dimethyl-p-phenylene oxide) thickener in 90% by weight of a mixture of 60 mole % of styrene and 40 mole % of maleic anhydride. The coated fibers were found to contain 42% by weight of resin and 58% by weight of glass. The molded bars were found to have a heat-distortion temperature of 174° C., a flexural modulus of $41.9 \times 10^5$ psi, a tensile strength in excess of $56.5 \times 10^3$ psi, a notched Izod impact strength of greater than 61 foot pounds per inch of notch, and a Shore D hardness of 93.

EXAMPLE 11

The procedure of Example 1 was repeated except that the monomer mixture was made up of 60 mole % of styrene and 40 mole % of maleic anhydride and the fiberglass strand rope was passed three times through the monomer solution and pipe reactor to build up the amount of resin on the glass. The final coated strands were found to contain 37% by weight of resin and 63% by weight of glass. The molded bars were found to have a flexural strength of $97 \times 10^3$ psi, a flexural modulus of $44 \times 10^5$ psi, a tensile strength in excess of $36.3 \times 10^3$ psi, a notched Izod impact strength of greater than 78 foot pounds per inch of notch, and a Rockwell M hardness of 101.

EXAMPLE 12

The procedure of Example 1 was repeated except that the monomer mixture was made up of 65 mole % of styrene and 35 mole % of maleic anhydride, and 25% by weight of the monomer mixture was calcium carbonate filler. The coated fibers were found to be made up of 34% by weight of resin, 41% by weight of glass, and 25% by weight of calcium carbonate. The molded bars were found to have a heat-distortion temperature of 187° C., a flexural strength of $73.6 \times 10^3$ psi, a flexural modulus of $36.6 \times 10^5$ psi, a tensile strength in excess of $59 \times 10^3$ psi, a notched Izod impact strength greater than 59 foot pounds per inch of notch, and a Rockwell M hardness of 108.

EXAMPLE 13

The procedure of Example 1 was repeated except that the monomer mixture was composed of 55 mole % of alpha-methyl styrene and 45 mole % of maleic anhydride. The coated fibers were found to contain 47% by weight of resin and 53% by weight of glass. The molded bars were found to have a heat-distortion temperature of 137° C., a flexural strength of $31.6 \times 10^3$ psi, a flexural modulus of $37 \times 10^5$ psi, a tensile strength of $42.9 \times 10^3$ psi, and a notched Izod impact strength of greater than 21 foot pounds per inch of notch.

EXAMPLE 14

The procedure of Example 13 was repeated in which fine-steel wire was included along with the glass fiber. The resin-coated glass-steel fibers were found to contain 35% by weight of resin, 12% by weight of steel, and 53% by weight of glass. The molded bars were found to have a flexural strength of $75.6 \times 10^3$ psi, a flexural modulus of $88.4 \times 10^5$ psi, and a notched Izod impact strength of greater than 17 foot pounds per inch of notch.

EXAMPLE 15

The procedure of Example 13 was repeated except that the monomer mixture was made up of 27.5 mole % of alpha-methyl styrene, 27.5 mole % of styrene, and 45 mole % of maleic anhydride. The coated fiber was found to contain 33% by weight of resin and 67% by weight of glass. The molded bars were found to have a heat-distortion temperature of 135° C., a flexural strength of $59.7 \times 10^3$ psi, a flexural modulus of $56.3 \times 10^5$ psi, a tensile strength of $34.9 \times 10^3$ psi, and a Shore D hardness of 87.

EXAMPLE 16

The procedure of Example 1 was repeated except that the monomer mixture was made up of 55 mole % of indene and 45 mole % of maleic anhydride. The coated fibers were found to contain 30% by weight of resin and 70% by weight of glass. The molded bar was found to have a heat-distortion temperature of 200° C., a flexural strength of $60.5 \times 10^3$ psi, a flexural modulus of $55.4 \times 10^5$ psi, a tensile strength of $24.2 \times 10^3$ psi, a notched Izod impact strength of greater than 35 foot pounds per inch of notch, and a Shore D hardness of 87.

EXAMPLE 17

The procedure of Example 1 was repeated except that the monomer mixture was made up of 27.5 mole % of indene, 27.5 mole % of styrene, and 45 mole % of maleic anhydride. The coated fibers were found to contain 32% by weight of resin and 68% by weight of glass. The molded bars were found to have a heat-distortion temperature of 175° C., a flexural strength of $87.1 \times 10^3$ psi, a flexural modulus of $52.4 \times 10^5$ psi, a tensile strength of $66.9 \times 10^3$ psi, a notched Izod impact strength of greater than 50 foot pounds per inch of notch, and a Rockwell M hardness of 108.

EXAMPLE 18

The procedure of Example 1 was repeated except that the monomer mixture was made up of 55 mole % of vinyl toluene and 45 mole % of maleic anhydride. The coated fibers were found to contain 31% by weight of resin and 69% by weight of glass. The molded bars were found to have a heat-distortion temperature of 172° C., a flexural strength of $111 \times 10^3$ psi, a flexural modulus of $45.1 \times 10^5$ psi, a tensile strength of $66.7 \times 10^3$ psi, a notched Izod impact strength of greater than 56 foot pounds per inch of notch, and a Rockwell M hardness of 107.

EXAMPLE 19

The procedure of Example 1 was repeated using as monomer mixture 30 mole % of styrene, 30 mole % of methyl methacrylate, and 40 mole % of maleic anhydride. The coated fibers contained 32% by weight of resin and 68% by weight of glass. Molded bars were found to have a heat-distortion temperature of 130° C., a flexural strength of $102 \times 10^3$ psi, a flexural modulus of $54.9 \times 10^5$ psi, a tensile strength in excess of $70 \times 10^3$ psi, and a notched Izod impact strength of greater than 69 foot pounds per inch of notch.

EXAMPLE 20

The procedure of Example 1 was repeated except that the monomer mixture was made up of 30 mole % of styrene, 30 mole % of methyl acrylate, and 40 mole % of maleic anhydride. The coated fibers had 27% by weight of resin and 73% by weight of glass in them. Molded bars were found to have a flexural strength of $141 \times 10^3$ psi, a flexural modulus of $58.9 \times 10^5$ psi, a tensile strength of greater than $90 \times 10^3$ psi, a notched Izod impact strength of greater than 55 foot pounds per inch of notch, and a Rockwell M hardness of 87.

EXAMPLE 21

The procedure of Example 1 was repeated except that Kevlar (DuPont aromatic polyamide) fiber was used instead of glass fiber and the monomer mixture was made up of 60 mole % of styrene and 40 mole % of maleic anhydride. The coated fibers were found to contain 40% by weight of resin and 60% by weight of polyamide fiber in them. Molded bars were found to have a heat-distortion temperature of 196° C., a flexural strength of $80.8 \times 10^3$ psi, a flexural modulus of $56.4 \times 10^5$ psi, a tensile strength of greater than $30 \times 10^3$ psi, and a notched Izod impact strength of greater than 44 foot pounds per inch of notch.

EXAMPLE 22

The procedure of Example 21 was repeated giving a coated fiber containing 49% by weight of resin and 51% by weight of fiber in it. Molded bars from this material were found to have a heat-distortion temperature of 197° C., a flexural strength of $79.1 \times 10^3$ psi, a flexural modulus of $51.2 \times 10^5$ psi, a tensile strength of greater than $72.9 \times 10^3$ psi, a notched Izod impact strength of greater than 38 foot pounds per inch of notch, and a Rockwell M hardness of 87.

We claim:

1. The method for manufacturing a molded article from a fiber-reinforced thermoplastic resin comprising
   (A) copolymerizing at least two vinyl monomers in the presence of fibers which are unidirectionally disposed to produce a resin-fiber composite composed of from about 60 to 95% by weight of fibers and correspondingly from about 5 to 40% by weight of resin, and
   (B) compression molding the substantially oriented resin-fiber composite at a suitable temperature and pressure to form said molded article.

2. The method of claim 1 wherein the monomers are selected from the group consisting of maleic anhydride, maleic acid, maleic esters, itaconic anhydride, itaconic acid, fumaric acid, fumaric esters, styrene, alpha-methyl styrene, the vinyl toluenes, the vinyl xylenes, indene, acrylonitrile, methacrylonitrile, acrylic acid, methacrylic acid, acrylic esters, methacrylic esters, acrylamide, methacrylamide, vinyl chloride, vinyl bromide, vinyl fluoride, vinylidene chloride, vinylidene bromide, vinylidene fluoride, vinyl acetate, isopropenyl acetate, vinyl propionates, vinyl butyrates, ethylene, propylene, dipropylene, isobutylene, diisobutylene, vinyl methyl ether, vinyl ethyl ether, the vinyl propyl ethers, the vinyl butyl ethers, butadiene, and isoprene.

3. The method of claim 2 wherein the fibers are selected from at least one member of the group consisting of glass, wool, cotton, wood, natural cellulosics, rayon, nylon, polyamide, polyimide, polyesters, carbon, acrylics, and mod acrylics.

4. The method of claim 1 wherein the monomers are maleic anhydride and styrene and the fibers are glass.

5. The method of claim 1 wherein the monomers are styrene and acrylonitrile and the fibers are glass.

6. The method of claim 1 wherein the monomers are styrene and dimethyl itaconate and the fibers are glass.

7. The method of claim 1 wherein the monomers are styrene and acrylic acid and the fibers are glass.

8. The method of claim 1 wherein the monomers are styrene and methyl methacrylate and the fibers are glass.

9. The method of claim 1 wherein the monomers are methyl methacrylate and maleic anhydride and the fibers are glass.

10. The method of claim 1 wherein the monomers are alpha-methyl styrene and maleic anhydride and the fibers are glass.

11. The process of claim 1 wherein said polymerization is bulk polymerization.

12. The process of claim 1 wherein the polymerization takes place in the absence of water.

13. The process of claim 1 wherein the resin fiber composite is oriented lengthwise.

14. The process of claim 1 wherein the resin fiber composite is oriented both lengthwise and widthwise.

* * * * *